(12) United States Patent
Yakovlev

(10) Patent No.: US 8,370,618 B1
(45) Date of Patent: Feb. 5, 2013

(54) MULTIPLE PLATFORM SUPPORT IN COMPUTER SYSTEM FIRMWARE

(75) Inventor: Sergiy B. Yakovlev, Duluth, GA (US)

(73) Assignee: American Megatrends, Inc., Norcross, GA (US)

(*) Notice: Subject to any disclaimer, the term of this patent is extended or adjusted under 35 U.S.C. 154(b) by 309 days.

(21) Appl. No.: 12/816,768

(22) Filed: Jun. 16, 2010

(51) Int. Cl.
G06F 9/00 (2006.01)
G06F 1/00 (2006.01)
G06F 15/177 (2006.01)
G06F 15/173 (2006.01)
G06F 13/00 (2006.01)
G06F 13/42 (2006.01)
G06F 13/24 (2006.01)
G06F 13/14 (2006.01)

(52) U.S. Cl. ............... 713/2; 713/1; 713/300; 709/222; 709/238; 710/104; 710/105; 710/260; 710/305

(58) Field of Classification Search ............... 713/1, 2, 713/300; 709/222, 238; 710/104, 105, 260, 710/305
See application file for complete search history.

(56) References Cited

U.S. PATENT DOCUMENTS

| | | | |
|---|---|---|---|
| 7,127,579 B2 * | 10/2006 | Zimmer et al. | 711/163 |
| 2001/0042242 A1 * | 11/2001 | Fish et al. | 717/6 |
| 2003/0115443 A1 | 6/2003 | Cepulis et al. | |
| 2003/0188146 A1 * | 10/2003 | Hale et al. | 713/1 |
| 2004/0268107 A1 | 12/2004 | Zimmer et al. | |
| 2005/0015430 A1 | 1/2005 | Rothman et al. | |
| 2009/0037719 A1 | 2/2009 | Sakthikumar et al. | |
| 2009/0064178 A1 | 3/2009 | Shamia et al. | |
| 2011/0113225 A1 * | 5/2011 | Lu et al. | 713/1 |

OTHER PUBLICATIONS

Internal Search Report dated Oct. 11, 2011 in PCT/US 11/40695 (International Filing Date Jun. 16, 2011, Inventor: Sergiy Yakovlev).

* cited by examiner

Primary Examiner — Stefan Stoynov
(74) Attorney, Agent, or Firm — Hope Baldauff Hartman, LLC

(57) ABSTRACT

Technologies are provided herein for multiple platform support in a computer system firmware. A firmware is built for each hardware platform to be supported. At built time of the firmware for each platform to be supported, an instance of platform specific information is extracted from the built firmware and stored. Once the platform specific information instances have been collected for each platform to be supported, the platform specific information instances are stored in a multi-platform firmware. At run-time of the multi-platform firmware, the particular hardware platform that the multi-platform firmware is executing upon is identified. Once the platform has been identified, the particular instance of platform specific information corresponding to the identified platform is selected. The selected instance of platform specific information is then loaded and exposed for consumption by other programs.

20 Claims, 7 Drawing Sheets

MULTIPLE PLATFORM SUPPORT IN COMPUTER SYSTEM FIRMWARE

BACKGROUND

It is not uncommon for computer system manufacturers to create many different computing system hardware platforms. A hardware platform is a particular combination of hardware components utilized to implement a computing system. For instance, one platform for implementing a computer system motherboard might include a particular chip set, processor, and number of expansion slots. Another platform for implementing a motherboard from the same manufacturer might include a different chip set, processor, number of expansion slots, and other hardware components or features.

A firmware is used by most computing systems to control the low-level operation of the computing system. In many computing systems, the firmware provides functionality for performing a power-on self-test ("POST") of the computing system, for performing an initial program load, or boot, of the computing system, for providing interfaces to the low-level operation of the computing system hardware to an operating system, and for performing other functions.

It is typically necessary to generate a custom firmware that supports the particular hardware and configuration of each platform. For instance, one firmware might be generated that supports a particular platform. In order to support a different platform, it is generally necessary to generate another firmware for supporting the different platform. Generation of a custom firmware for each different hardware platform in this manner, however, can be time consuming and expensive for a computer system manufacturer.

It is with respect to these and other considerations that the disclosure presented herein has been made.

SUMMARY

Technologies are provided herein for multiple platform support in a computer system firmware. Through the concepts and technologies presented herein, a single firmware can be generated and utilized that supports multiple different hardware platforms. In this manner, computer system manufacturers can be freed from the time consuming and expensive task of generating a custom firmware for each supported hardware platform.

According to one aspect presented herein, a firmware is built for each hardware platform to be supported. At build time for the firmware of each platform to be supported, an instance of platform specific information is extracted from the built firmware and stored. The platform specific information provides information about the specific hardware platform. For instance, the platform specific information might include information regarding Peripheral Component Interconnect ("PCI") routing for a programmable interrupt controller ("PIC"), interrupt request ("IRQ") routing information for an advanced programmable interrupt controller ("APIC"), an advanced configuration and power interface ("ACPI") namespace table, build time to run time bus translation information, data identifying one or more input/output APIC devices on the platform, data identifying one or more hot pluggable slots and parenting bridges in the platform, and other platform-specific information.

Once the platform specific information instances have been collected for each hardware platform to be supported, the platform specific information instances are stored in a multi-platform firmware. At run-time of the multi-platform firmware, the particular hardware platform that the multi-platform firmware is executing upon is identified. Once the hardware platform has been identified, the particular instance of platform specific information corresponding to the identified platform is selected. The selected instance of platform specific information is then loaded and exposed for consumption by other programs executing within the multi-platform firmware, an operating system, or other programs. In this manner, a single firmware can be configured to support multiple distinct hardware platforms.

It should be appreciated that the above-described subject matter may also be implemented as a computing system, a computer-controlled apparatus, a computer process, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for supporting multiple computer system platforms in a computer firmware. In the following detailed description, references are made to the accompanying drawings that form a part hereof, and which are shown by way of exemplary embodiments and implementations. Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments disclosed herein.

Figure 1:
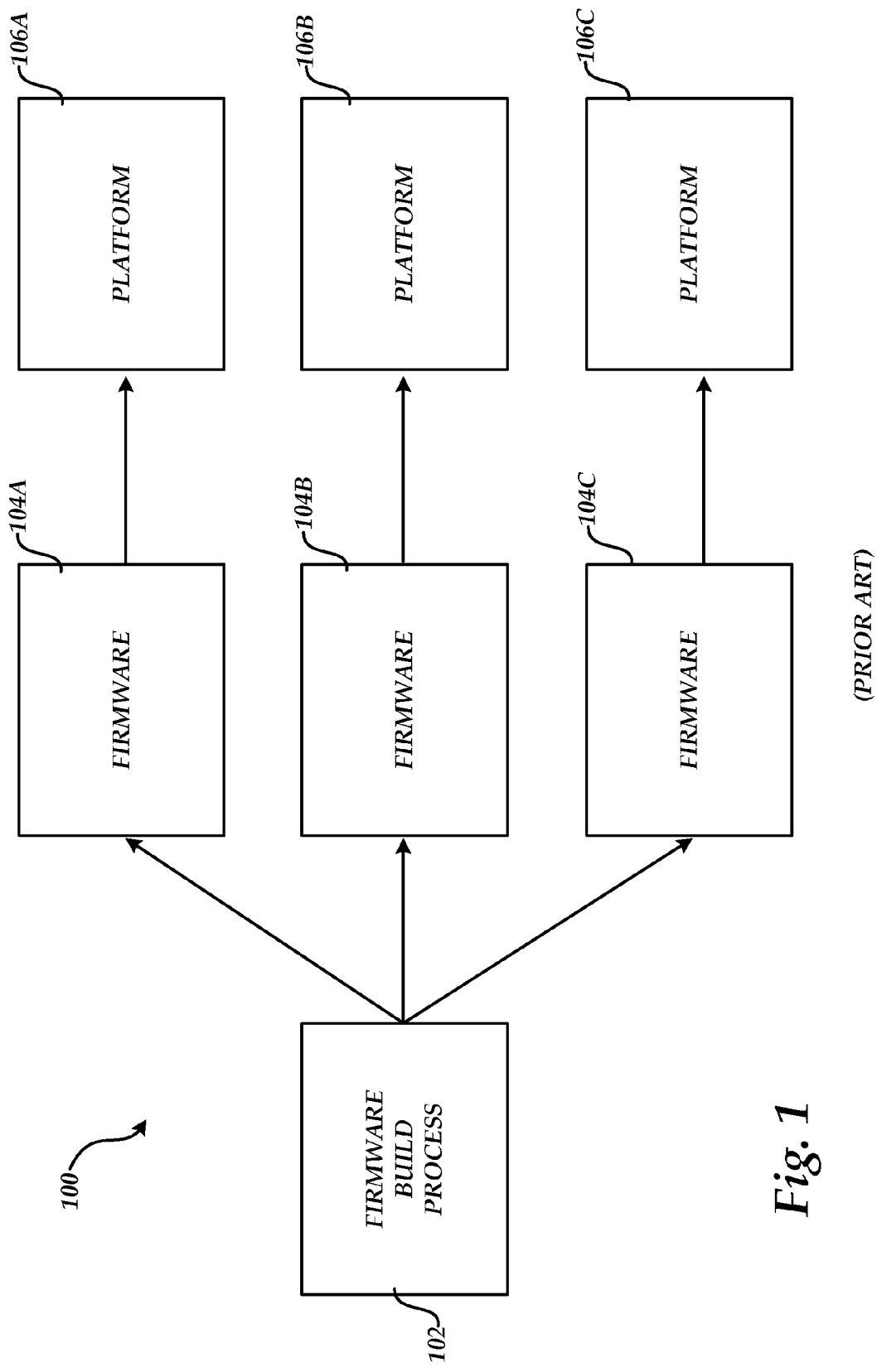
FIG. 1 is a block diagram showing aspects of a prior art mechanism for generating a custom firmware for each of a plurality of computer system platforms.

FIG. 1 is a block diagram showing aspects of a prior mechanism for generating a firmware for each of a plurality of computer system platforms. As discussed briefly above, it is not uncommon for computer system manufacturers to create many different computing system hardware platforms, such as the platforms 106A-106C. A hardware platform is a particular combination of hardware components utilized to implement a computing system. For instance, one platform, such as the platform 106A, might include a particular chip set, processor, and number of expansion slots. Another platform for implementing a motherboard from the same manufacturer, such as the platform 106B, might include a different chip set, processor, number of expansion slots, and other hardware components or features.

As also discussed generally above, a firmware is used by many computing systems to control the low-level operation of the computing system. In many computing systems, the firmware provides functionality for performing a POST of the computing system, for performing an initial program load, or boot, of the computing system, for providing interfaces to the low-level operation of the computing system hardware to an operating system, and for performing other functions.

It has been previously necessary to generate a custom firmware that supports the particular hardware and configuration of each platform. For instance, in the example shown in FIG. 1, a firmware 104A might be generated that supports a particular platform, such as the platform 106A. In order to support a different platform, such as the platform 106B, it has been previously necessary to generate another firmware, such as the firmware 104B, for supporting the different platform 106B. It might also be necessary to generate yet another firmware 104C for another different platform 106C. Generation of a custom firmware 104A-104C for each different hardware platform 106A-106C in this manner, however, can be time consuming and expensive for a computer system manufacturer.

Through the concepts and technologies presented herein, a single firmware can be generated and utilized that supports multiple different hardware platforms. In this manner, computer system manufacturers can be freed from the time consuming and expensive task of generating a custom firmware for each supported hardware platform. In this regard, FIG. 2 shows a block diagram that illustrates a simplified overview 200 of one process presented herein for generating a computer system firmware capable of supporting multiple computer system platforms in one embodiment disclosed herein.

Figure 2:
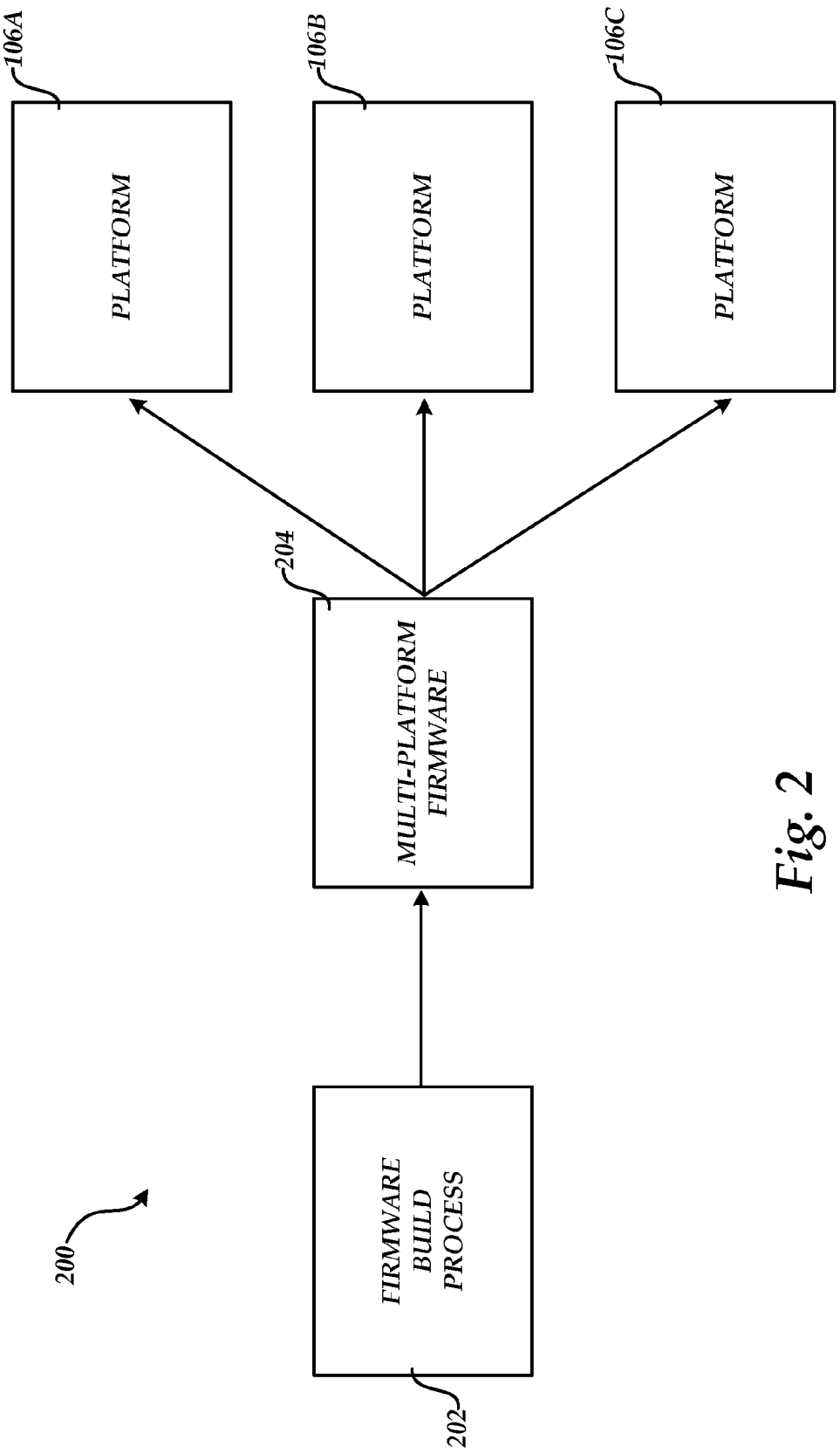
FIG. 2 is a block diagram showing an overview of one process presented herein for generating a multi-platform computer system firmware capable of supporting multiple computer system platforms in one embodiment disclosed herein.

As shown in FIG. 2, a firmware build process 202 is utilized in one embodiment to build a multi-platform firmware 204 that can be executed on any of a number of different hardware platforms 106A-106C. As will be described in greater detail below with respect to FIGS. 3 and 5, the firmware build process 202 first builds a custom firmware for each of the hardware platforms 106A-106C to be supported by the multi-platform firmware 204. An instance of platform specific information is extracted from the built firmware and stored for use within the multi-platform firmware 204. The platform specific information provides information about each specific hardware platform. For instance, the platform specific information might include information regarding Peripheral Component Interconnect ("PCI") routing for a programmable interrupt controller ("PIC"), interrupt request ("IRQ") routing information for an advanced programmable interrupt controller ("APIC"), an advanced configuration and power interface ("ACPI") namespace table, build time to run time bus translation information, data identifying one or more input/output APIC devices on the platform, data identifying one or more hot pluggable slots and parenting bridges in the platform, and other platform-specific information.

Once the platform specific information instances have been collected for each of the hardware platforms 106A-106C to be supported, the platform specific information instances are stored in the multi-platform firmware 204. As will be described in greater detail below with respect to FIG. 4, the particular hardware platform 106A-106C that the multi-platform firmware 204 is executing upon is identified at run-time of the multi-platform firmware 204. Once the hardware platform 106A-106C has been identified, the particular instance of platform specific information corresponding to the identified platform is selected. The selected instance of platform specific information is then loaded and exposed for consumption by other programs executing within the multi-platform firmware 204, an operating system, or other programs. In this manner, a single multi-platform firmware 204 can be configured to support multiple distinct hardware platforms. Additional details regarding this process will be provided below with respect to FIGS. 3-6.

Figure 3:
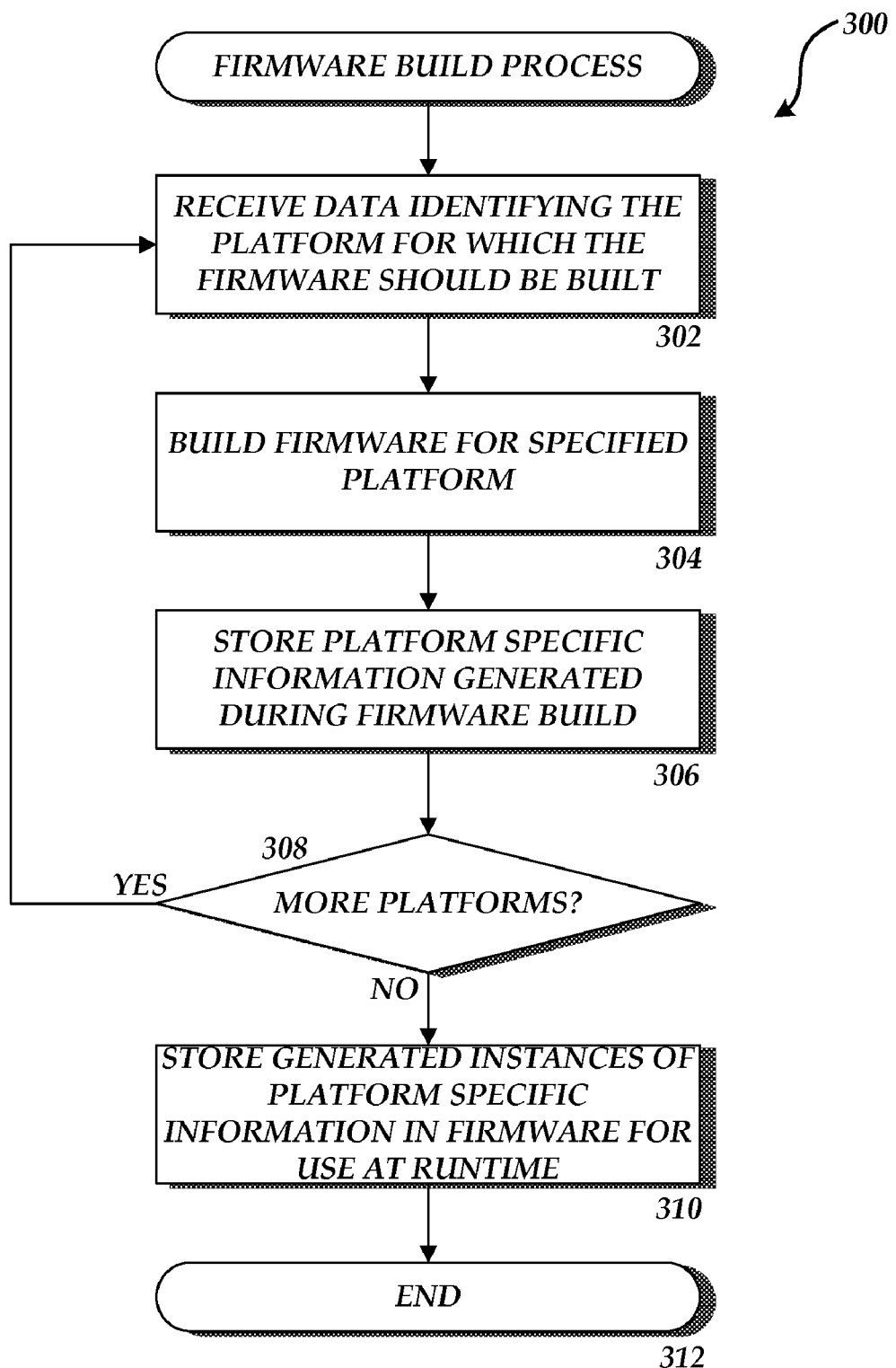
FIG. 3 is a flow diagram showing a routine that illustrates a firmware build process for creating a multi-platform firmware capable of supporting multiple computer system platforms in one embodiment disclosed herein.

Referring now to FIG. 3, a flow diagram showing a routine 300 that illustrates a firmware build process 202 for creating a multi-platform firmware 204 capable of supporting multiple computer system platforms in one embodiment disclosed herein will be described. It should be appreciated that the logical operations described herein with respect to the various figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the firmware build process 302 receives data identifying the platform for which a firmware should be built. For instance, if a multi-platform firmware 204 is being built that will provide support for the platforms 106A-106C, the platform 106A may first be specified. The platforms 106B and 106C may be subsequently specified as will be described in greater detail below.

From operation 302, the routine 300 proceeds to operation 304 where the firmware build process 202 builds the firmware 104A for the platform 106A. An appropriate integrated development environment ("IDE") may be utilized to compile and build source code for the firmware 104A. As used herein the term "build" refers to the process of compiling source code to produce an executable firmware. As known in the art, the compilation process might also include linking libraries and other processes.

Once the firmware 104A has been built, the firmware build process 202 extracts an instance of platform specific information from the built firmware 104A and stores the extracted instance for use within the multi-platform firmware 204. As discussed briefly above, the platform specific information is data that provides information about a specific hardware platform. Details regarding the platform specific information will be provided below with respect to FIGS. 5 and 6.

From operation 306, the routine 300 proceeds to operation 308 where a determination is made as to whether additional platforms remain to be built. For instance, if the multi-platform firmware 204 will support the platforms 106B and 106C, then the routine 300 will proceed from operation 308 to operation 302 where the firmware for the next platform will be built and the platform specific information will be extracted from the built firmware in the manner described above. This process continues until all of the instances of platform specific information have been extracted for the platforms 106A-106C to be supported by the multi-platform firmware 204.

Once all of the instances of platform specific information have been extracted, the routine 300 proceeds from operation 308 to operation 310. At operation 310, the multi-platform firmware 204 is built. This includes storing the instances of platform specific information generated previously in the multi-platform firmware 204 for use at runtime. Details regarding the runtime operation of the multi-platform firmware 204 will be provided below with regard to FIGS. 4 and 5. From operation 310, the routine 300 proceeds to operation 312, where it ends.

Figure 4:
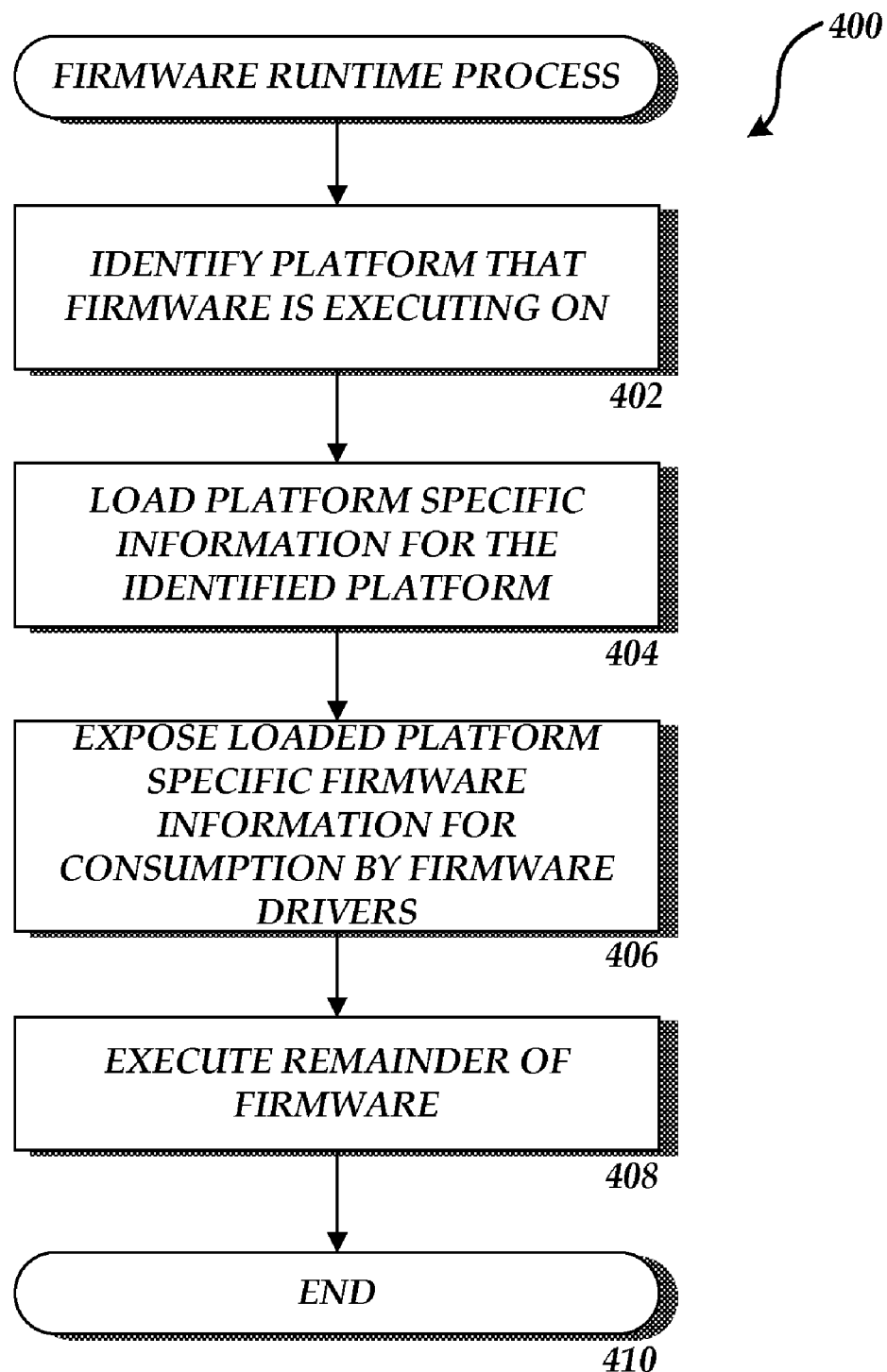
FIG. 4 is a flow diagram showing a routine that illustrates the runtime operation of a multi-platform firmware capable of supporting multiple computer system platforms in one embodiment disclosed herein.

FIG. 4 is a flow diagram showing a routine 400 that illustrates the runtime operation of a multi-platform firmware 204 capable of supporting multiple computer system platforms in one embodiment disclosed herein. FIG. 4 will be described with reference to FIG. 5, which is a software architecture diagram showing a simplified software architecture for a multi-platform firmware 204 capable of supporting multiple computer system platforms in one embodiment disclosed herein.

The routine 400 begins at operation 402 where a multi-platform driver 502 executing within the firmware 204 identifies the platform 106A-106C that the multi-platform firmware 204 is executing on. For instance, in one embodiment the platform of the computer system may be identified by examining a platform identifier (ID) globally unique identifier (GUID) and a platform ID pre-extensible firmware interface module (PEIM). Other mechanisms for identifying the particular platform 106A-106C upon which the multi-platform firmware 204 is executing may also be utilized.

Once the multi-platform driver 502 has identified the platform upon which the multi-platform firmware 204 is executing, the routine 400 proceeds from operation 402 to operation 404. At operation 404, the multi-platform driver 502 loads the instance of platform specific information 504A-402C for the identified platform 106A-106C upon which the multi-platform firmware 204 is executing.

Figure 5:
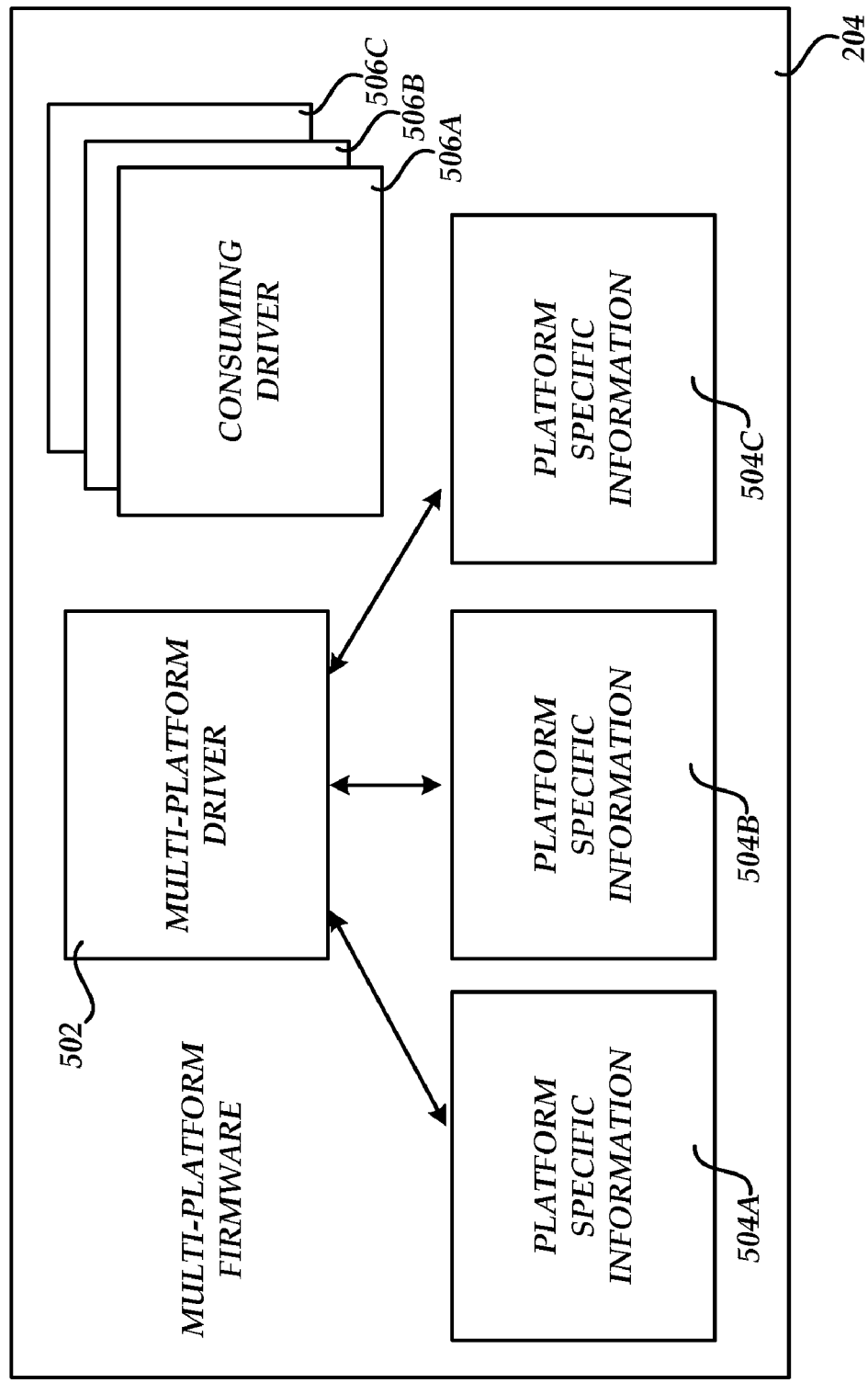
FIG. 5 is a software architecture diagram showing a simplified software architecture for a multi-platform firmware capable of supporting multiple computer system platforms in one embodiment disclosed herein.

In the example shown in FIG. 5, the platform specific information 504A corresponds to the platform 106A, the platform specific information 504B corresponds to the platform 106B, and the platform specific information 504C corresponds to the platform 106C. In this example, if the multi-platform driver 502 determines that the multi-platform firmware 204 is executing on the platform 106A, then the multi-platform driver 502 loads the platform specific information 504A. If the multi-platform driver 502 determines that the multi-platform firmware 204 is executing on the platform 106B, then the multi-platform driver 502 loads the platform specific information 504B. If the multi-platform driver 502 determines that the multi-platform firmware 204 is executing on the platform 106C, then the multi-platform driver 502 loads the platform specific information 504C.

Once the multi-platform driver 502 has loaded the platform specific information for the identified platform at operation 404, the routine 400 proceeds to operation 406. At operation 406, the multi-platform driver 502 exposes the loaded platform specific information for consumption for other programs. For instance, the platform specific information may be exposed for consumption by other programs executing within the multi-platform firmware, such as the consuming drivers 506A-506C, an operating system, or other programs.

From operation 406, the routine 400 proceeds to operation 408 where the multi-platform firmware 204 continues its execution. As discussed briefly above, the multi-platform firmware 204 also provides functionality for performing a POST of the computing system, for performing an initial program load, or boot, of the computing system, for providing interfaces to the low-level operation of the computing system hardware to an operating system, and for performing other functions. The routine 400 proceeds from operation 408 to operation 410, where it ends.

Figure 6:
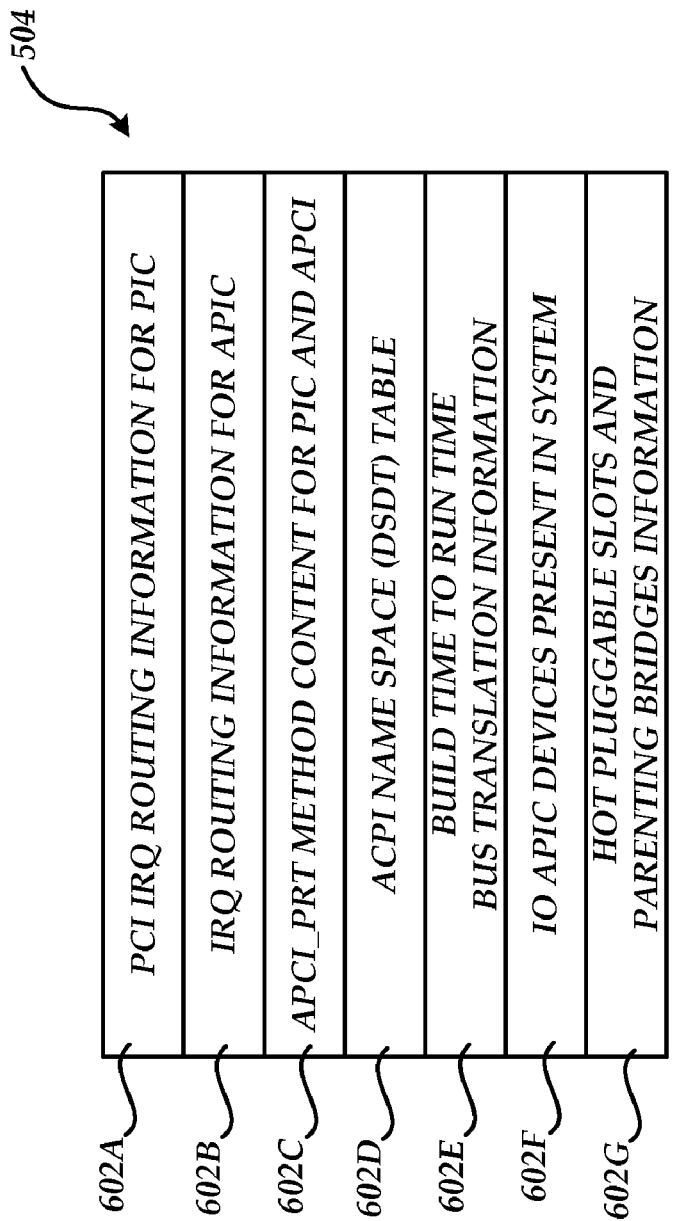
FIG. 6 is a data structure diagram showing a data structure for storing platform specific information utilized by a multi-platform firmware capable of supporting multiple computer system platforms in one embodiment disclosed herein.

FIG. 6 is a data structure diagram showing a data structure 504 for storing an instance of platform specific information utilized by a multi-platform firmware 204 capable of supporting multiple computer system platforms in one embodiment disclosed herein. As shown in FIG. 6, the illustrative data structure shown in FIG. 6 might include the fields 602A-602G. The field 602A may be configured to store information regarding Peripheral Component Interconnect ("PCI") routing for a programmable interrupt controller ("PIC"). According to an embodiment, the PCI routing information may comprise a $PIR table known to those in the art.

The field 602B may be configured to store interrupt request ("IRQ") routing information for an advanced programmable interrupt controller ("APIC"). The field 602C may be configured to store advanced configuration and power interface ("APCI")_PRT method content for a PICT and an APIC. The field 602D may be configured to store an advanced configuration and power interface ("ACPI") namespace table. According to an embodiment, the namespace table comprises a differentiated system description table ("DSDT").

The field 602E may be configured to store build time to run time bus translation information. The field 602F may be configured to store data identifying one or more input/output ("I/O") APIC devices on the identified platform. The field 602G may be configured to store data identifying one or more hot pluggable slots and parenting bridges in the platform. It should be appreciated that the data structure shown in FIG. 6 is merely illustrative and that other platform-specific information may also be stored in a similar manner.

Figure 7:
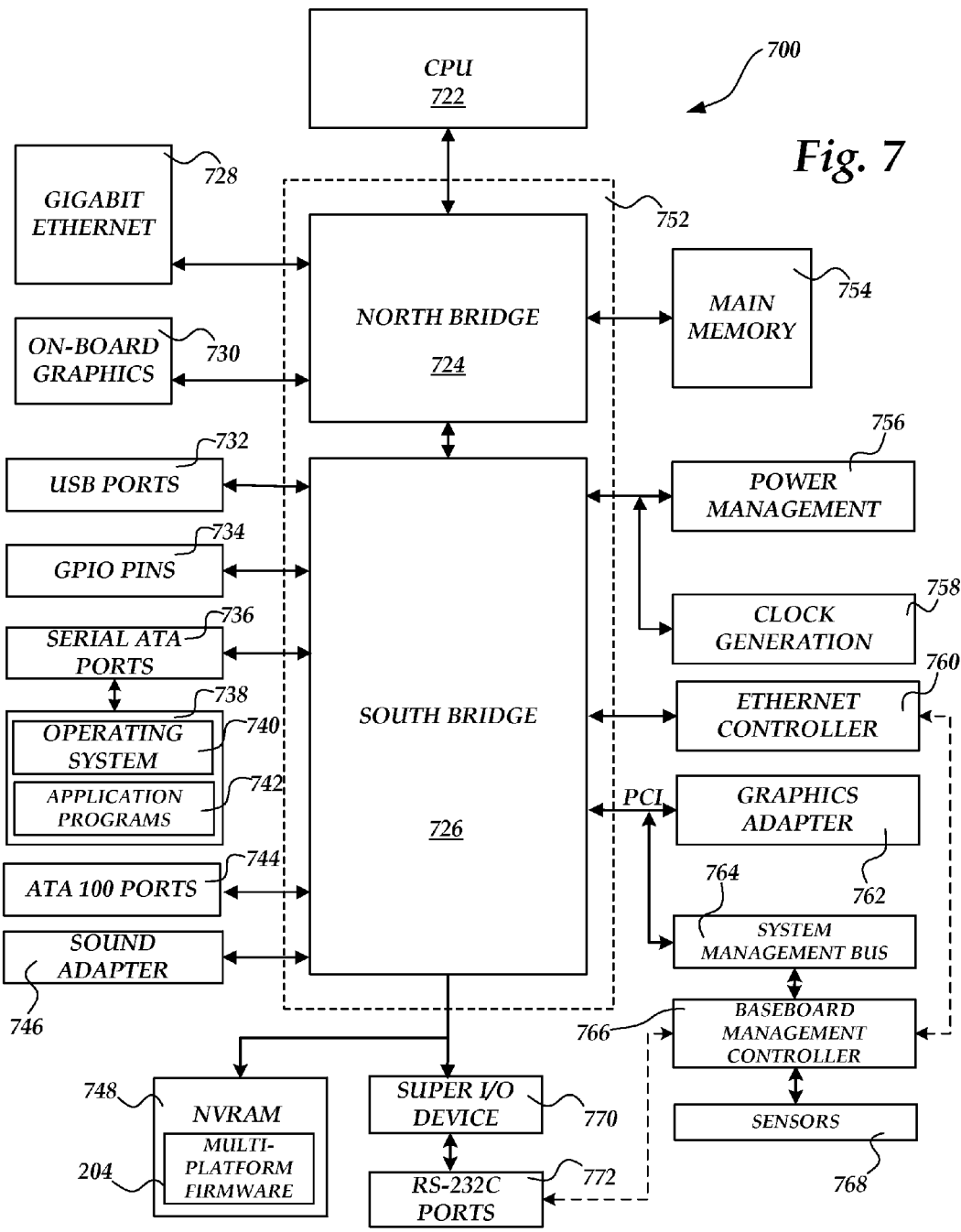
FIG. 7 is a computer architecture diagram showing an illustrative computer architecture that might be utilized to implement a computing system that embodies the various concepts and technologies presented herein.

FIG. 7 is a computer architecture diagram showing an illustrative computer architecture that might be utilized to implement the embodiments presented herein. FIG. 7 and the following discussion are intended to provide a brief, general description of one suitable computing environment in which the embodiments described herein may be implemented. While the technical details are presented herein in the general context of program modules that execute in conjunction with the execution of a multi-platform firmware, those skilled in the art will recognize that the embodiments may also be implemented in combination with other program modules.

Generally, program modules include routines, programs, components, data structures, scripts, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

As discussed briefly above, FIG. 7 shows an illustrative computer architecture that may be utilized to embody the various computing systems described herein. It should be appreciated that the computer architecture shown in FIG. 7 may be utilized to embody a computer system capable of executing the multi-platform firmware 204 or other computer systems utilized to perform the firmware build process 202.

The illustrative computer architecture shown in FIG. 7 is for a computer 700 that includes a baseboard, or "motherboard", which is a printed circuit board to which a multitude of components or devices may be connected by way of a system bus or other electrical communication path. In one illustrative embodiment, a CPU 722 operates in conjunction with a chipset 752. The CPU 722 is a central processor that performs arithmetic and logical operations necessary for the operation of the computer. The computer 700 may include a multitude of CPUs 722.

The chipset 752 includes a north bridge 724 and a south bridge 726. The north bridge 724 provides an interface between the CPU 722 and the remainder of the computer 700. The north bridge 724 also provides an interface to a random access memory ("RAM") used as the main memory 754 in the computer 700 and, possibly, to an on-board graphics adapter 730. The north bridge 724 may also include functionality for providing networking functionality through a gigabit Ethernet adapter 728. The gigabit Ethernet adapter 728 is capable of connecting the computer 700 to another computer via a network. Connections that may be made by the network adapter 728 may include LAN or WAN connections. LAN and WAN networking environments are commonplace in offices, enterprise-wide computer networks, intranets, and the Internet. The north bridge 724 is connected to the south bridge 726.

The south bridge 726 is responsible for controlling many of the input/output functions of the computer 700. In particular, the south bridge 726 may provide one or more universal serial bus ("USB") ports 732, a sound adapter 746, an Ethernet controller 760, and one or more general-purpose input/output ("GPIO") pins 734. The south bridge 726 may also provide a bus for interfacing peripheral card devices such as a graphics adapter 762. In one embodiment, the bus comprises a peripheral component interconnect ("PCI") bus. The south bridge 726 may also provide a system management bus 764 for use in managing the various components of the computer 700. Additional details regarding the operation of the system management bus 764 and its connected components are provided below.

The south bridge 726 is also configured to provide one or more interfaces for connecting mass storage devices to the computer 700. For instance, according to an embodiment, the south bridge 726 includes a serial advanced technology attachment ("SATA") adapter for providing one or more serial ATA ports 736 and an ATA 100 adapter for providing one or more ATA 100 ports 744. The serial ATA ports 736 and the ATA 100 ports 744 may be, in turn, connected to one or more mass storage devices storing an operating system 740 and application programs 742, such as the SATA disk drive 738. As known to those skilled in the art, an operating system 740 comprises a set of programs that control operations of a computer and allocation of resources. An application program is software that runs on top of the operating system software, or other runtime environment, and uses computer resources to perform application specific tasks desired by the user.

The mass storage devices connected to the south bridge 726, and their associated computer-readable media, provide non-volatile storage for the computer 700. Although the description of computer-readable media contained herein refers to a mass storage device, such as a hard disk or CD-ROM drive, it should be appreciated by those skilled in the art that computer-readable media can be any available media that can be accessed by the computer 700. By way of example, and not limitation, computer-readable media includes volatile and non-volatile, removable and non-removable media implemented in any method or technology for storage of information such as computer-readable instructions, data structures, program modules or other data. For instance, computer-readable media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 700.

A low pin count ("LPC") interface may also be provided by the south bridge 726 for connecting a "Super I/O" device 770. The Super I/O device 770 is responsible for providing a number of input/output ports, including a keyboard port, a mouse port, a serial interface 772, a parallel port, and other types of input/output ports. The LPC interface may also connect a computer-readable media such as a ROM or a flash memory such as the NVRAM 748 for storing a multi-platform firmware 204 that includes program code containing the basic routines that help to start up the computer 700 and for performing the functionality described above for multi-platform support.

As described briefly above, the south bridge 726 may include a system management bus 764. The system management bus 764 may include a baseboard management controller ("BMC") 766. In general, the BMC 766 is a microcontroller that monitors operation of the computer system 700. In a more specific embodiment, the BMC 766 monitors health-related aspects associated with the computer system 700, such as, but not limited to, the temperature of one or more components of the computer system 700, speed of rotational components (e.g., spindle motor, CPU Fan, etc.) within the system, the voltage across or applied to one or more components within the system 700, and the available or used capacity of memory devices within the system 700. To accomplish these monitoring functions, the BMC 766 is communicatively connected to one or more components by way of the management bus 764. In an embodiment, these components include sensor devices for measuring various operating and performance-related parameters within the computer system 700.

The management bus 764 is used by the BMC 766 to request and/or receive various operating and performance-related parameters from one or more components, which are also communicatively connected to the management bus 764. For instance, in one embodiment, the management bus 764 may communicatively connect the BMC 766 to a CPU temperature sensor and a CPU fan (not shown in FIG. 7), thereby providing a means for the BMC 766 to monitor and/or control operation of these components. The BMC 766 may also include sensors 768 connected directly thereto.

The serial ports 772 and the Ethernet controller 760 may be utilized to establish a connection with the BMC 766. Through the use of the BMC 766, the sensors 768, and the system management bus 764, the computer 700 may collect the management data 112 discussed above and make this data available to requesting programs. The BMC 766 may also provide functionality for setting aspects of the management data 112 as discussed above, such as for instance resetting the computer 700 or setting the power state of the computer 700.

It should be appreciated that the software components described herein may, when loaded into the CPU 722 and executed, transform the CPU 722 and the overall computer 700 from a general-purpose computing system into a special-purpose computing system customized to facilitate the functionality presented herein. The CPU 722 may be constructed from any number of transistors or other discrete circuit elements, which may individually or collectively assume any number of states. More specifically, the CPU 722 may operate as a finite-state machine, in response to executable instructions contained within the software modules disclosed herein. These computer-executable instructions may transform the CPU 722 by specifying how the CPU 722 transitions between states, thereby transforming the transistors or other discrete hardware elements constituting the CPU 722.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It also should be appreciated that the computer 700 may comprise other types of computing devices, including hand-held computers, embedded computer systems, personal digital assistants, and other types of computing devices known to those skilled in the art. It is also contemplated that the computer 700 may not include all of the components shown in FIG. 7, may include other components that are not explicitly shown in FIG. 7, or may utilize an architecture completely different than that shown in FIG. 7.

Based on the foregoing, it should be appreciated that concepts and technologies for multiple platform support in a computer system firmware have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for supporting a plurality of computing system platforms in a computer system firmware, the method comprising performing computer-implemented operations for:

executing the computer system firmware on a computer system, the computer system comprising one of a plurality of possible platforms;

identifying by way of the computer system firmware the platform of the computer system, comprising identifying the platform of the computer system by examining a platform identifier (ID), globally unique identifier (GUID), and a platform ID pre-extensible firmware interface module (PEIM);

selecting by way of the computer system firmware an instance of platform specific information for the identified platform from a plurality of instances of platform specific information stored in the firmware; and exposing by way of the computer firmware system firmware the selected instance of platform specific information for consumption by one or more programs.

2. The computer-implemented method of claim 1, wherein the platform specific information comprises Peripheral Component Interconnect (PCI) routing information for a programmable interrupt controller (PIC).

3. The computer-implemented method of claim 2, wherein the PCI routing information for the PIC comprises a $PIR table.

4. The computer-implemented method of claim 1, wherein the platform specific information comprises interrupt request (IRQ) routing information for a advanced programmable interrupt controller (APIC).

5. The computer-implemented method of claim 1, wherein the platform specific information comprises advanced configuration and power interface (ACPI)_PRT method content for a PIC and an APIC.

6. The computer-implemented method of claim 1, wherein the platform specific information comprises an ACPI namespace table.

7. The computer-implemented method of claim 6, wherein the ACPI namespace table comprises a differentiated system description table (DSDT).

8. The computer-implemented method of claim 1, wherein the platform specific information comprises built time to run time bus translation information.

9. The computer-implemented method of claim 1, wherein the platform specific information comprises data identifying one or more input/output (I/O) APIC devices present in the computer system.

10. The computer-implemented method of claim 1, wherein the platform specific information comprises data identifying one or more hot pluggable slots and parenting bridges in the computer system.

11. A computer system comprising:
a central processing unit (CPU); and
a non-volatile memory connected to the CPU having stored therein a plurality of instances of platform specific information and a firmware executable by the CPU, the firmware configured when executed to
identify the platform of the computer system from a plurality of possible platforms, comprising identifying the platform of the computer system by examining a platform identifier (ID), globally unique identifier (GUID), and a platform ID pre-extensible firmware interface module (PEIM),
select an instance of platform specific information for the identified platform from the plurality of instances of platform specific information stored in the firmware, and
cause the selected instance of platform specific information to be exposed for consumption by one or more programs.

12. The computer system of claim 11, wherein the platform specific information comprises Peripheral Component Interconnect (PCI) routing information for a programmable interrupt controller (PIC).

13. The computer system of claim 12, wherein the platform specific information further comprises interrupt request (IRQ) routing information for a advanced programmable interrupt controller (APIC).

14. The computer system of claim 13, wherein the platform specific information further comprises advanced configuration and power interface (ACPI)_PRT method content for a PIC and an APIC.

15. The computer system of claim 14, wherein the platform specific information further comprises an ACPI namespace table.

16. The computer system of claim 15, wherein the platform specific information further comprises built time to run time bus translation information.

17. The computer system of claim 16, wherein the platform specific information comprises data identifying one or more input/output (I/O) APIC devices present in the computer system.

18. The computer system of claim 12, wherein the PCI routing information for the PIC comprises a $PIR table.

19. The computer system of claim 11, wherein the platform specific information comprises data identifying one or more hot pluggable slots and parenting bridges.

20. A non-transitory computer-readable storage medium having computer-executable instructions stored thereupon which, when executed by a computer system, cause the computer system to:
identify a platform of the computer system from a plurality of possible platforms by examining a platform identifier (ID), globally unique identifier (GUID), and a platform ID pre-extensible firmware interface module (PEIM);
select an instance of platform specific information for the identified platform from a plurality of instances of platform specific information stored in a non-volatile memory of the computer system; and to
cause the selected instance of platform specific information to be exposed for consumption by one or more programs.

\* \* \* \* \*